(12) United States Patent
Abe et al.

(10) Patent No.: US 8,901,184 B2
(45) Date of Patent: Dec. 2, 2014

(54) FOAMED RESIN MOLDED ARTICLE, FOAM INSULATED WIRE, CABLE AND METHOD OF MANUFACTURING FOAMED RESIN MOLDED ARTICLE

(71) Applicant: Hitachi Cable, Ltd., Tokyo (JP)

(72) Inventors: Masahiro Abe, Hitachi (JP); Akinari Nakayama, Hitachinaka (JP); Masafumi Nagano, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 13/837,865

(22) Filed: Mar. 15, 2013

(65) Prior Publication Data

US 2014/0080933 A1 Mar. 20, 2014

(30) Foreign Application Priority Data

Sep. 18, 2012 (JP) ................................. 2012-204682

(51) Int. Cl.
| | | |
|---|---|---|
| *C08J 9/06* | (2006.01) | |
| *C08J 3/22* | (2006.01) | |
| *H01B 7/02* | (2006.01) | |
| *H01B 3/30* | (2006.01) | |
| *C08J 9/10* | (2006.01) | |
| *C08L 23/08* | (2006.01) | |
| *C08L 27/18* | (2006.01) | |

(52) U.S. Cl.
CPC .................. *H01B 3/307* (2013.01); *H01B 7/02* (2013.01); *H01B 3/308* (2013.01); *C08J 9/10* (2013.01); *C08L 23/08* (2013.01); *C08J 9/06* (2013.01); *C08J 3/22* (2013.01); *C08L 27/18* (2013.01)
USPC .............................. 521/79; 521/131; 521/145

(58) Field of Classification Search
CPC ............ C08J 9/004; C08J 9/0028; C08J 9/16; C08J 2201/03; C08J 2203/06; C08J 2207/06
USPC ........................................... 521/79, 131, 145
See application file for complete search history.

(56) References Cited

U.S. PATENT DOCUMENTS

| | | | |
|---|---|---|---|
| 4,615,850 A | 10/1986 | Pecsok | |
| 5,609,892 A * | 3/1997 | Garcia et al. .................. | 425/311 |
| 2009/0018225 A1 | 1/2009 | Gemmel et al. | |
| 2011/0198106 A1* | 8/2011 | Sasamura et al. ....... | 174/110 SR |
| 2012/0045603 A1 | 2/2012 | Zerafati et al. | |

FOREIGN PATENT DOCUMENTS

| | | |
|---|---|---|
| JP | H02-34735 | 9/1990 |
| JP | 03-072534 | 3/1991 |
| JP | 2007-238829 | 9/2007 |
| JP | 2011-076860 | 4/2011 |
| WO | 2010126773 | 11/2010 |

OTHER PUBLICATIONS

Japanese Office Action 2012-204682 mailed Sep. 30, 2014 and English translation of reasons for refusal. X.

* cited by examiner

*Primary Examiner* — Nathan M Nutter
(74) *Attorney, Agent, or Firm* — Roberts Mlotkowski Safran & Cole P.C.

(57) ABSTRACT

A foamed resin molded article that is obtained by kneading and foaming a pellet including one or more fluorine resins and a chemical blowing agent in an extrusion molding process. The pellet is formed by mixing powder of the one or more fluorine resins and powder of the chemical blowing agent without heating and melting, and solidifying and molding. A method of manufacturing a foamed resin molded article includes making pellets including one or more fluorine resins and a chemical blowing agent, and kneading and foaming the pellets in an extrusion molding process.

13 Claims, 8 Drawing Sheets

- DRAIN WIRE 402
- 400 CABLE
- 401 SHIELDING TAPE
- 10  10 FOAM INSULATED WIRE

- 500 CABLE
- 401 SHIELDING TAPE
- 10  10 FOAM INSULATED WIRE

- 40 FOAM INSULATED WIRE
- 1 INNER CONDUCTOR
- 3 OUTER STRENGTHENING LAYER
- 2 FOAMED INSULATION LAYER

- 50 FOAM INSULATED WIRE
- 1 INNER CONDUCTOR
- 3 OUTER STRENGTHENING LAYER
- 2 FOAMED INSULATION LAYER

FIG.12

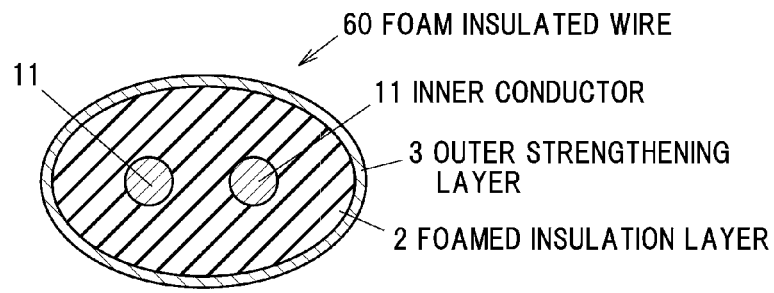

60 FOAM INSULATED WIRE
11 INNER CONDUCTOR
3 OUTER STRENGTHENING LAYER
2 FOAMED INSULATION LAYER

FIG.13

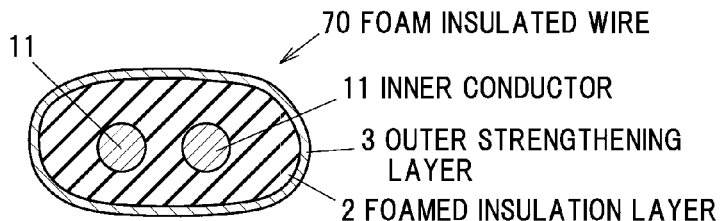

70 FOAM INSULATED WIRE
11 INNER CONDUCTOR
3 OUTER STRENGTHENING LAYER
2 FOAMED INSULATION LAYER

FIG.14

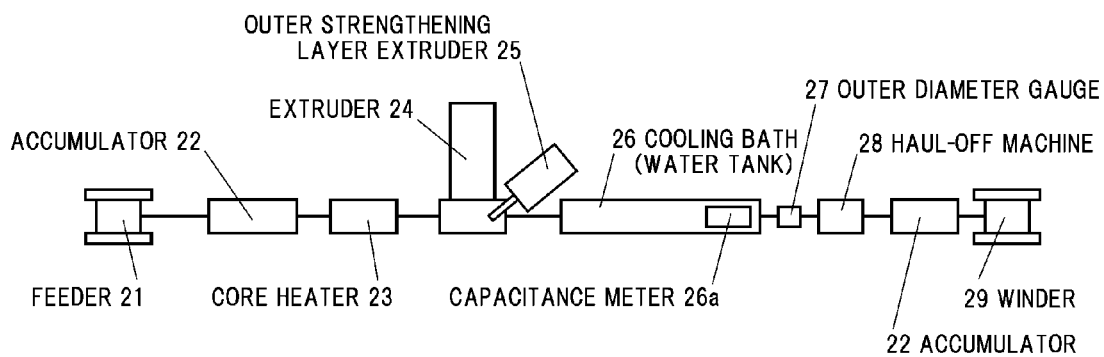

OUTER STRENGTHENING LAYER EXTRUDER 25
EXTRUDER 24
27 OUTER DIAMETER GAUGE
ACCUMULATOR 22
26 COOLING BATH (WATER TANK)
28 HAUL-OFF MACHINE
FEEDER 21
CORE HEATER 23
CAPACITANCE METER 26a
29 WINDER
22 ACCUMULATOR

FIG.15
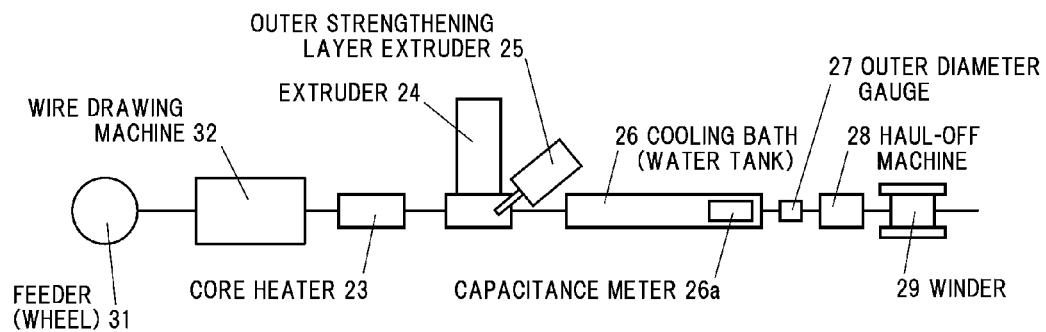
FIG.16A  FIG.16B  FIG.16C
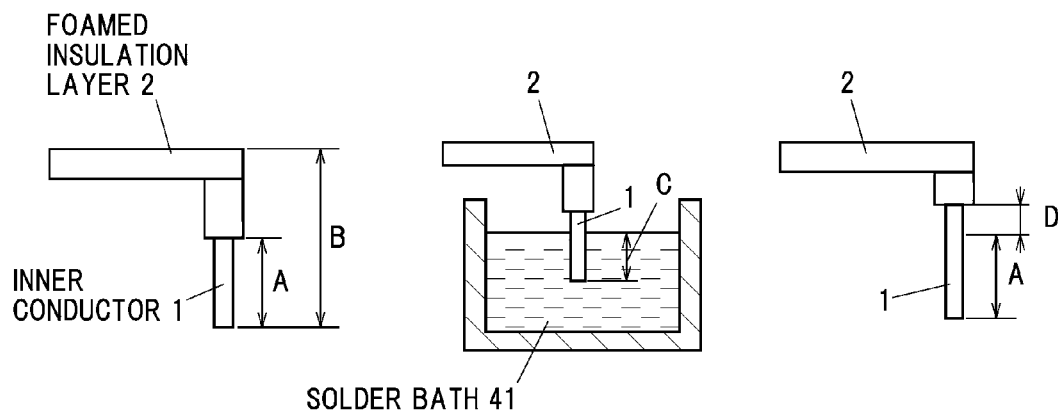

FOAMED RESIN MOLDED ARTICLE, FOAM INSULATED WIRE, CABLE AND METHOD OF MANUFACTURING FOAMED RESIN MOLDED ARTICLE

The present application is based on Japanese patent application No. 2012-204682 filed on Sep. 18, 2012, the entire contents of which are incorporated herein by reference.

BACKGROUND OF THE INVENTION

1. Field of the Invention

The invention relates to a foamed resin molded article, a foam insulated wire, a cable and a method of manufacturing a foamed resin molded article.

2. Description of the Related Art

A wire having a fluorine resin insulation (so-called fluorocarbon wire) has a high melting point and excellent solder dip resistance, and is thus used for solder connections of a cable and a terminal/connector. In addition, the fluorocarbon wire is excellent in durability against environmental degradation such as chemical corrosion, and is thus used for internal wiring of electronic devices such as computers and for wiring of high frequency equipment such as mobile phones or measurement instruments. Furthermore, the fluorocarbon wire is excellent in heat resistance and cold resistance, and is thus used for a wiring of high-temperature components or is used as a lead wire in low-temperature environments.

As an insulation material in a conventional fluorocarbon wire, polytetrafluoroethylene (PTFE), tetrafluoroethylene perfluoroalkyl vinyl ether copolymer (PFA) or tetrafluoroethylene-hexafluoropropylene copolymer (FEP) is used. These materials are excellent in heat resistance, cold resistance and chemical resistance, and have a very low relative dielectric constant of 2.0 to 2.1.

However, increases in the transmission speed of electronic devices (equal or greater than 10 Gbps/second) and the higher operating frequency of telecommunication equipment (GHz band frequency) in recent years necessitates further decreasing the dielectric constant of the insulation material. Accordingly, a fluorine resin composition is fiberized (fibrillation) and is made porous by foaming or stretching to decrease its dielectric constant.

Principally, PTFE is made porous. For example, a tape-shaped PTFE which has been made porous by stretching is wound as an insulation around an outer periphery of an inner conductor to decrease a dielectric constant (see JP-Y-H02-34735 (Utility Model)). The porous PTFE tape is principally used for a high-speed transmission thin cable.

However, such a technique results in degraded characteristics due to, e.g., deterioration in adhesion to the inner conductor. In addition, since the insulation layer is thickened by winding the PTFE tape several times, the production rate slows down and the cost is increased.

In addition, since PTFE cannot be melt-extruded, the method used to form a porous wire insulation involves impregnating PTFE powder with a solvent such as solvent naphtha to form a paste, covering an inner conductor with the paste thus formed by using a paste extruder, and subsequently vaporizing the solvent portion of the paste and sintering the remaining PTFE particles in a firing furnace. A porous insulation formed by paste extrusion is principally used for a high-frequency coaxial cable.

In one method using a paste extruder, PTFE powder and a pore-forming agent such as dicarboxylic acid are kneaded together and the pore-forming agent is vaporized at the time of sintering to manufacture a foam insulated wire (see JP-A-2011-76860).

However, foaming by such a pore-forming agent results in a low degree of foaming is low and the resulting insulated wire is not suitable for use as a low-loss cable.

On the other hand, in the case of PFA or FEP which can be melt-extruded, a physical foaming method may be used in which an inert gas such as chlorofluorocarbon, nitrogen gas or carbon dioxide is injected into a cylinder of an extruder during extrusion so that a foamed insulating material is formed by a pressure difference at the time of discharging the material (see Japanese patent No. 4879613).

However, when using such a physical foaming method, it is difficult to control the amount of gas used as a foaming agent. As a result, it is not possible to control the size of the air bubbles in the insulation. In thin foam insulated wire, a too large bubble size increases the outside diameter variation and causes deterioration in the capacitance or characteristic impedance. On the other hand, in a thick coaxial cable, enormous air bubbles may be formed between the inner conductor and the foamed insulation and a voltage standing wave ratio (VSWR) (which is an index of stability in a length direction of a cable) deteriorates.

Meanwhile, a chemical foaming method is also known in which a resin compound is foamed by adding a chemical blowing agent which produces foam by heat at the time of melt extrusion.

Such chemical blowing agents are classified as either inorganic base or organic base agents.

A general inorganic-based chemical blowing agent is sodium bicarbonate, which generates carbon dioxide with large solubility in a polymer at the time of decomposition. However, since metal salts having a large dielectric constant ($\in$) and a large dielectric loss tangent (tan $\delta$) are produced as a decomposition product, it is difficult to use the resulting foamed insulation for a high-speed transmission cable or a high-frequency cable, both of which are required to have a low dielectric constant. Therefore, an organic-based chemical blowing agent is generally used.

The organic-based chemical blowing agents include, e.g., bistetrazole-based compounds such as bistetrazole diammonium, bistetrazole piperazine and bistetrazole diguanidine. A method of manufacturing a foamed insulation using an organic-based chemical blowing agent includes a masterbatch (MB) method and a full-compound (FC) method. In the MB method, in order to improve the dispersibility of the organic based chemical blowing agent, a blowing agent master batch (MB) formed of a resin with a chemical blowing agent concentrated to about 10 times the actual usage amount is made and the master batch is diluted with a base resin to the actual usage amount, thereby forming a resin foam. On the other hand, in the FC method, a foamable compound is made by kneading a chemical blowing agent and the total mass of the resin at a time and is then supplied to a molding machine, thereby forming a resin foam.

SUMMARY OF THE INVENTION

Among the fluorine resins used as a material of the above-mentioned insulation, FEP has a melting point of 270° C. and PFA has a melting point of 310° C. Accordingly, an extrusion temperature for melt extrusion is 300° C. for FEP and 330° C. for PFA. Meanwhile, azodicarbonamide (ADCA) which is an azo compound most commonly used as a chemical blowing agent has a decomposition temperature of 200° C. and a tetrazole-based chemical foaming agent of which decomposition temperature is the highest has a kick-off temperature of not more than 300° C. Therefore, there is a problem that the chemical blowing agent is decomposed by being kneaded with the fluorine resin and it is thus not possible to use either the MB method or the FC method for melt extrusion of PFA and FEP.

Accordingly, it is an object of the invention to provide a foamed resin molded article that is manufactured by foaming a fluorine resin using a chemical blowing method, as well as a foam insulated wire, a cable and a method of manufacturing the foamed resin molded article.

(1) According to one embodiment of the invention, such a foamed resin molded article is obtained by kneading and foaming a pellet comprising one or more fluorine resins and a chemical blowing agent in an extrusion molding process.

In the above embodiment (1) of the invention, the following modifications and changes can be made.

(i) The pellet is formed by mixing a powder of the one or more fluorine resins and a powder of the chemical blowing agent without heating and melting, and solidifying and molding.

(ii) The pellet is prepared as a master batch and is kneaded with a base resin containing one or more fluorine resins in an extrusion molding process.

(iii) The fluorine resin comprises tetrafluoroethylene perfluoroalkyl vinyl ether copolymer (PFA) or tetrafluoroethylene-hexafluoropropylene copolymer (FEP).

(iv) The fluorine resin contained in the pellet and/or the fluorine resin contained in the base resin comprises tetrafluoroethylene perfluoroalkyl vinyl ether copolymer (PFA) or tetrafluoroethylene-hexafluoropropylene copolymer (FEP).

(v) The pellet comprises not less than 0.1 mass % and not more than 3 mass % of the chemical blowing agent with respect to the total mass of the foamed resin molded article.

(vi) The master batch comprises not less than 1 mass % and not more than 30 mass % of the chemical blowing agent with respect to the total mass of the master batch.

(vii) The chemical blowing agent comprises an organic-based chemical blowing agent,
wherein the organic-based chemical blowing agent comprises one or more selected from azo compounds, hydrazide compounds, nitroso compounds, semicarbazide compounds, hydrazo compounds, tetrazole compounds, triazine compounds, ester compounds, hydrazone compounds and diazinon compounds.

(viii) The pellet further comprises a foam nucleating agent.

(ix) The foamed resin molded article has a degree of foaming that is not less than 30%.

(x) The foamed resin molded article has an average bubble size (equivalent circle diameter) of not more than 200 μm.

(2) According to another embodiment of the invention, a foam insulated wire comprises:
an insulation layer comprising the foamed resin molded article according to the embodiment (1).

(3) According to another embodiment of the invention, a cable comprises:
the foam insulated wire according to the embodiment (2).

(4) According to another embodiment of the invention, a method of manufacturing a foamed resin molded article comprises:
making pellets comprising one or more fluorine resins and a chemical blowing agent; and
kneading and foaming the pellets in an extrusion molding process.

Effects of the Invention

According to the invention, a foamed resin molded article, a foam insulated wire, and a cable may be manufactured by foaming a fluorine resin using the aforementioned chemical blowing method.

BRIEF DESCRIPTION OF THE DRAWINGS

Next, the present invention will be explained in more detail in conjunction with appended drawings, wherein:

FIG. 12 is a cross sectional view showing a cross-section structure of a foam insulated wire in a fifth embodiment of the invention;

FIG. 13 is a cross sectional view showing a cross-section structure of a foam insulated wire in a modification of FIG. 12;

FIG. 14 is a schematic view showing a production line for manufacturing a thin foam insulated wire in Examples;

FIG. 15 is a schematic view showing a production line for manufacturing a thick foam insulated wire in Examples;

FIGS. 16A to 16C are explanatory diagrams illustrating a method of measuring solder dip resistance of the foam insulated wire;

DETAILED DESCRIPTION OF THE PREFERRED EMBODIMENTS

Configuration of Formed Resin Molded Article

Figure 1A:
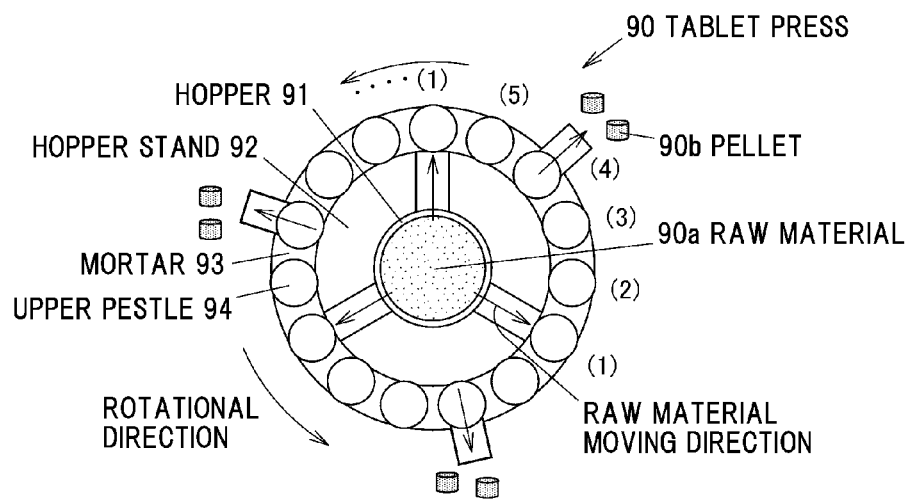
FIGS. 1A and 1B are schematic explanatory diagrams illustrating a pellet making process in an embodiment of the present invention.

A formed resin molded article in an embodiment of the invention is a foam molded product obtained from pellets containing one or more fluorine resins and a chemical blowing agent which are kneaded and foamed in an extrusion molding process.

Pellet

A pellet used in the embodiment of the invention contains one or more fluorine resins and a chemical blowing agent. The pellet herein refers to an object solidified and molded into a predetermined shape. The shape thereof is not specifically limited, and various shapes such as cylindrical shape, spherical shape, polygonal column shape and ring shape may be employed. A shape like a drug tablet is specifically preferable.

It is possible to suitably use a pellet formed by mixing one or more fluorine resins in a powder form and a chemical blowing agent in a powder form without heating and melting, and solidifying and molding. Since, in such a pellet, the fluorine resin and the chemical blowing agent are substantially uniformly dispersed and the chemical blowing agent is not decomposed by heat, a foam molded product having excellent characteristics is obtained when using this pellet for extrusion molding.

Size of the pellet is not specifically limited as long as the size allows the pellet to be loaded into an extruder. However, in case of having, e.g., a cylindrical shape, it is preferable that the pellet have a size of about 4 to 10 mm in diameter and about 4 to 10 mm in height (thickness).

A preferred method of pelleting is a compression molding for which a tablet press for tabletting drug tablets, etc., can be used. Polytetrafluoroethylene (PTFE) or wax, etc., may be added as a binder at the time of pelleting.

Since pelletization provides uniform feeding of the material to a screw in an extruder and resin pressure in the extruder is uniformly applied to the chemical blowing agent, it is possible to uniformly disperse and dissolve a cracked gas of the chemical blowing agent in a molten fluorine resin. If mixed powder is loaded as-is into the extruder without pelletization, the powder is not uniformly fed at the screw and variation in resin pressure occurs. In case of extrusion foaming, it is necessary to dissolve a foaming agent (cracked gas) in a molten resin in a cylinder of the extruder under a high resin pressure, and accordingly, variation in resin pressure in the cylinder causes a phenomenon in which the gas once dissolved in the molten resin is separated due to supersaturation and it is not possible to manufacture a uniformly foamed wire.

One or More Fluorine Resins

It is preferable that tetrafluoroethylene perfluoroalkyl vinyl ether copolymer (PFA) or tetrafluoroethylene-hexafluoropropylene copolymer (FEP) be used for one or more fluorine resins. PFA and FEP may be combined. A melting point of PFA is about 300 to 315° C. and that of FEP is about 260 to 270° C.

In addition to PFA and FEP, it is possible to use ethylene tetrafluoroethylene hexafluoropropylene copolymer (EFEP) or ethylene tetrafluoroethylene copolymer (ETFE) which have a relatively low melting point.

The fluorine resin used as a raw material of the pellet is most preferably used in a powder form but may be used in a granular form. In addition, a commercially available pellet-shaped fluorine resin can be used as a raw material after crushed into powder or granule.

In the case of extrusion molding by the full-compound method, the fluorine resin is preferably added to the pellet so that 97 to 99.9 mass % of the fluorine resin is contained in the foamed resin molded article. 97 to 99.7 mass % is more preferably, and 98 to 99.5 mass % is.

Chemical Blowing Agent

In the embodiment of the invention, a mixture of powders is simply compression-molded and is pelletized by a tablet press, etc., without heating and it is therefore possible to use any chemical blowing agents regardless of a level of decomposition temperature.

The chemical blowing agent used in the embodiment of the invention is preferably an organic-based chemical blowing agent. The organic-based chemical blowing agent is preferably one or more selected from azo compounds, hydrazide compounds, nitroso compounds, semicarbazide compounds, hydrazo compounds, tetrazole compounds, triazine compounds, ester compounds, hydrazone compounds and diazinon compounds. One or more selected from azo compounds, hydrazide compounds and tetrazole compounds are more preferable.

In more detail, the azo compounds include, e.g., azodicarbonamide (ADCA), azobisisobutyronitrile (AIBN) and barium azodicarboxylate (Ba-ADC). The hydrazide compounds include, e.g., 4,4'-oxybis(benzenesulfonyl hydrazide (OBSH) and p-toluenesulfonyl hydrazide. The nitroso compounds include, e.g., dinitroso-pentamethylene tetramine (DPT). The semicarbazide compounds include, e.g., p-toluenesulfonyl semicarbazide (TSSC). The hydrazo compounds include, e.g., hydrazodicarbonamide (HDCA). The tetrazole compounds include, e.g., bistetrazole diammonium, bistetrazole piperazine, bistetrazole diguanidine, 5-phenyltetrazole, azobistetrazole guanidine and azobistetrazole diaminoguanidine. The triazine compounds include, e.g., trihydrazino triazine (THT). The ester compounds include, e.g., hydrazo carboxylate ester (HDC-ESTER), azodicarboxylate ester (ADC-ESTER) and citrate ester. The hydrazone compounds include, e.g., sulfonyl hydrazide. The diazinon compounds include, e.g., 5-phenyl-3,6-dihydro-1,3,4-oxadiazin-2-one. Two or more thereof may be combined.

It is preferable that the chemical blowing agent be added to the pellet in an amount of 0.1 to 3 mass % with respect to the total mass of the foamed resin molded article. 0.3 to 3 mass % is more preferable, and 0.5 to 2 mass % is still more preferable. The additive amount of the chemical blowing agent required to obtain a desired degree of foaming is derived based on gas yield at the time of decomposition of the chemical foaming agent and a resin discharge rate from the extruder. Since an influence of cracked residue of the chemical blowing agent is small if the content of the chemical blowing agent is within the above-mentioned range, a foamed resin molded article providing an electric wire with good electrical characteristics is obtained. In addition, a foamed resin molded article having small variation in bubble size is obtained.

Master Batch

It is possible to manufacture the foamed resin molded article in the embodiment of the invention not only by extrusion using the full-compound method but also by extrusion using the master-batch method. In this case, it is preferable that the above-mentioned pellet be used as a master batch. The content of the chemical blowing agent in the pellet as a master batch is preferably 1 to 30 mass % with respect to the total mass of the master batch, more preferably 5 to 20 mass %, and still more preferably about 10 mass %. The pellets as a master batch are kneaded with a below-described base resin containing one or more fluorine resins in an extrusion molding process. In this case, the pellets as a master batch and the pellets of the fluorine resin as the base resin can be dry-blended and extruded at the time of extrusion molding.

Base Resin

In the embodiment of the invention, the same fluorine resin as that contained in the above-mentioned pellet can be used as the base resin used for extrusion molding by the master-batch method. It is especially preferable to use PFA and/or FEP.

It is preferable that the base resin be also in a pellet form when used for extrusion molding. The shape and size of the pellet are the same as the pellet containing the chemical blowing agent. It is possible to suitably use a commercially available pellet-shaped PFA and/or FEP.

Other Components

The pellet used in the embodiment of the invention may further contain a foam nucleating agent. Alternatively, pellets containing a foam nucleating agent may be made separately from the pellets containing the chemical blowing agent. The size of the generated air bubbles can be made fine by combining the foam nucleating agent. It is possible to use a foam nucleating agent which is not decomposed in the molten fluorine resin and has good dispersibility. It is possible to suitably use, e.g., boron nitride, talc, zeolite, silica, activated carbon and silica gel, etc. The foam nucleating agent may be added to the base resin.

An antioxidant, a lubricant, a copper inhibitor, a flame retardant, a flame-retardant aid, a colorant, a filler, a light stabilizer and a cross-linking agent, etc., which are typically mixed to an insulation layer of an insulated wire may be added to the pellet used in the embodiment of the invention. These additives may be added to the base resin.

The obtained foamed resin molded article includes cracked residue of the chemical blowing agent. It is preferable to remove an eliminable cracked residue. Examples of the cracked residues are as follows: the cracked residue of the azo compound is, e.g., cyanuric acid, urazole and biurea, that of the hydrazide compound is, e.g., polydithiophenyl ether and polythiophenyl benzenesulfonyl ether, that of the nitroso compound is, e.g., hexamethylene tetramine, and that of the hydrazo compound is, e.g., urazole.

Characteristics, Shape and Intended Use of Foamed Resin Molded Article

In a preferred embodiment of the invention, the foamed resin molded article has an average bubble size (equivalent circle diameter) of not more than 200 μm. When the foamed resin molded article is used for an insulation of a thin insulated wire, the average bubble size (equivalent circle diameter) is not more than 100 μm, preferably not more than 65 μm. When the foamed resin molded article is used for an insulation of a thick insulated wire, the average bubble size (equivalent circle diameter) is not more than 200 μm, preferably not more than 160 μm.

In a preferred embodiment of the invention, the foamed resin molded article has a degree of foaming of not less than 30%. The degree of foaming in a further preferred embodiment is not less than 35%, and that in a still further preferred embodiment is not less than 40%.

In a preferred embodiment of the invention, the foamed resin molded article has a characteristic impedance of 48 to 52Ω.

In a preferred embodiment of the invention, the foamed resin molded article is excellent in characteristics such as solder dip resistance, heat resistance, a deformation ratio, a pull-out force and a voltage standing wave ratio (VSWR).

The foamed resin molded article in the embodiment of the invention can be formed into various shapes, and can have, e.g., a string-like shape, a plate-like shape, a film-like shape and a pipe shape.

The foamed resin molded article in the embodiment of the invention can be suitably used for an insulation layer of an insulated wire and a cable. It is possible to suitably use for an insulation layer of, e.g., a differential signal transmission cable capable of transmitting at high speed of 10 Gbps-class or more.

Method of Manufacturing Foamed Resin Molded Article

A method of manufacturing a foamed resin molded article in the embodiment of the invention includes a step of making pellets containing one or more fluorine resins and a chemical blowing agent and a step of kneading and foaming the pellets in an extrusion molding process.

Figure 1B:
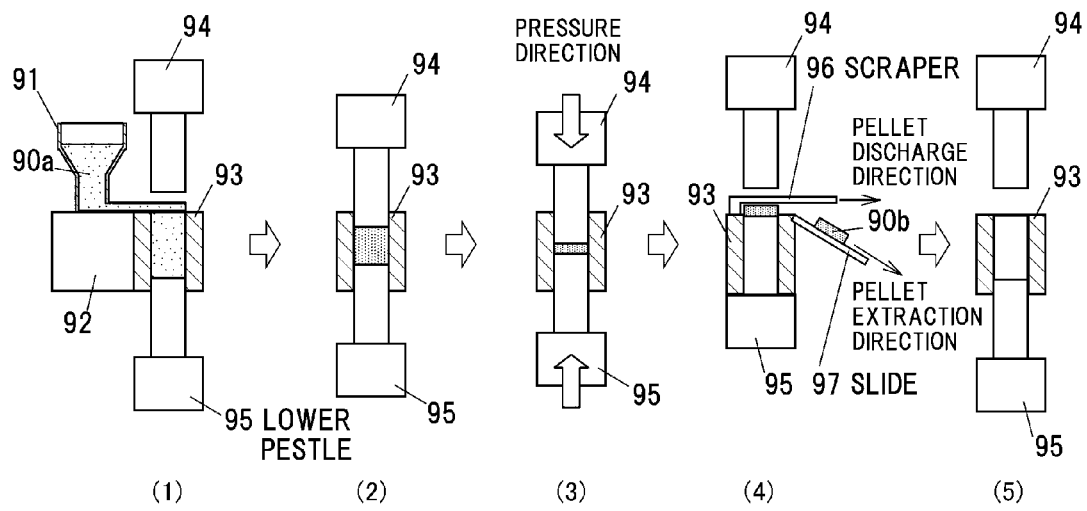

A compression molding method using a tablet press will be described below as an example of the step of making pellets containing one or more fluorine resins and a chemical blowing agent. FIGS. 1A and 1B are schematic explanatory diagrams illustrating a pellet making process in the embodiment of the invention. FIG. 1A is a schematic view showing a tablet press for molding into pellets as viewed from the upper side, and FIG. 1B is an explanatory diagram illustrating a tabletting step performed at positions (1) to (5) shown in FIG. 1A.

Firstly, a raw material 90a to be loaded into a hopper 91 of a tablet press 90 is prepared. Fluorine resin powder, chemical blowing agent powder and, if necessary, other additives are weighed and are then well mixed using a mixing apparatus, thereby obtaining the raw material 90a. All materials may be loaded into the mixing apparatus at a time, or the other additives may be added after pre-mixing the fluorine resin powder and the chemical blowing agent powder. General powder mixers such as tumbler mixer, henschel mixer or shaker can be used as the mixing apparatus.

When extrusion molding is carried out by the full-compound method, the whole mass of the fluorine resin powder, the chemical blowing agent powder and other additives are mixed and pelletized by the tablet press. On the other hand, when extrusion molding is carried out by the master-batch method, the fluorine resin powder and the chemical blowing agent powder for master batch pellet having a high concentration of chemical foaming agent and other additives are mixed and pelletized by the tablet press while the fluorine resin powder as the base resin and, if necessary, other additives are mixed and pelletized by the tablet press.

As a tabletting method, there are a direct tabletting method in which mixed powder is used as-is to make tablets and a granule tabletting method in which mixed powder is formed into granules and is then made into tablets. Both methods can be used in the embodiment of the invention.

A tableting process consists of five steps, which are (1) a weighting step in which the raw material 90a in the hopper 91 is weighted and supplied into a mortar 93, (2) a primary pressurization step of primarily applying low pressure to the raw material 90a by an upper pestle 94 and a lower pestle 95, (3) a secondary pressurization step of secondary applying pressure of several tens MPa to the raw material 90a and molding by the upper pestle 94 and the lower pestle 95, (4) a discharge step in which a pellet 90b is extracted from the mortar 93 by a scraper 96 and is discharged to outside of the tablet press 90 along a slide 97 and (5) a cleaning step of cleaning the inside of the mortar 93. The steps (1) to (5) respectively correspond to (1) to (5) shown in FIGS. 1A and 1B. Three to fifteen sets of the (1) to (5) are circumferentially aligned and rotated, thereby allowing continuous tabletting work to be carried out. This allows not less than 100,000 pellets to be manufactured per hour when counted by the number of pellets (not less than 10 kg/hr when converted into mass).

In the tabletting process, it is necessary to optimize tabletting pressure and tabletting speed (revolution of the tablet press). When the tabletting pressure is too high, the pellets may be broken, or the pellets which become too hard may cause too large load to be applied to an extruder motor of an extrusion molding machine and the abnormal load stops the extrusion molding machine. On the other hand, when the tabletting pressure is too low, the pellets have small strength and are thus broken when loaded into the extrusion molding machine, and may not be fed by a screw. When the raw material 90a composed of, e.g., the fluorine resin powder and the chemical blowing agent powder is used, it is preferable to adjust the tabletting pressure to 30 to 40 kPa and the tabletting speed (revolution) to 50 to 60 rpm.

The pellets made under optimum conditions can be fed by a feed section of the screw of the extruder. In addition, gas generated by sufficient melting of the fluorine resin and resulting decomposition of the chemical blowing agent in a compression zone of the screw can be sufficiently mixed with the molten resin and it is thereby possible to dissolve the gas in the resin.

In the step of kneading and foaming by extrusion molding, the extruder should be corrosion-proof when the foamed resin molded article is formed as, e.g., an insulation layer of an insulated wire. An extrusion temperature is important for extrusion for a foam insulated wire and a preferred extrusion temperature in case of using FEP as a high-melting-point fluorine resin is a cylinder temperature of 230° C. to 320° C., a head temperature of about 320° C. and a nozzle temperature of about 320° C. Meanwhile, a preferred extrusion temperature in case of using PFA as a high-melting-point fluorine resin is a cylinder temperature of 260° C. to 350° C., a head temperature of about 350° C. and a nozzle temperature of about 340° C.

Structures of Foam Insulated Wire and Cable

A foam insulated wire in embodiments of the invention has an insulation layer formed of the foamed resin molded article in the embodiment of the invention.

Meanwhile, a cable in the embodiments of the invention has the foam insulated wire in the embodiments of the invention.

First Embodiment of the Invention

Figure 2:
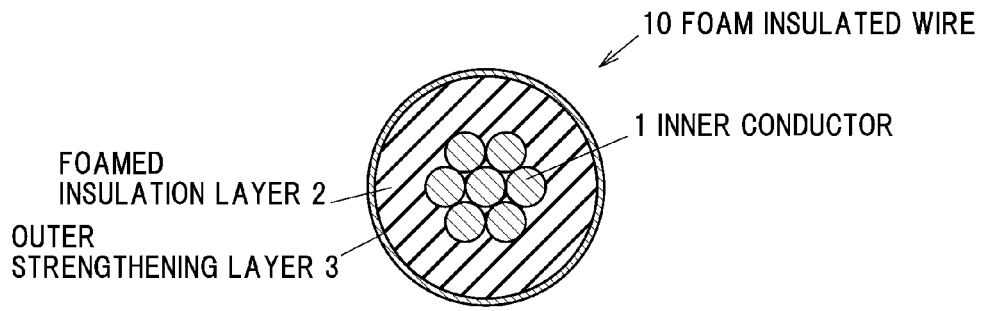
FIG. 2 is a cross sectional view showing a cross-section structure of a foam insulated wire in a first embodiment of the invention.
Figure 3:
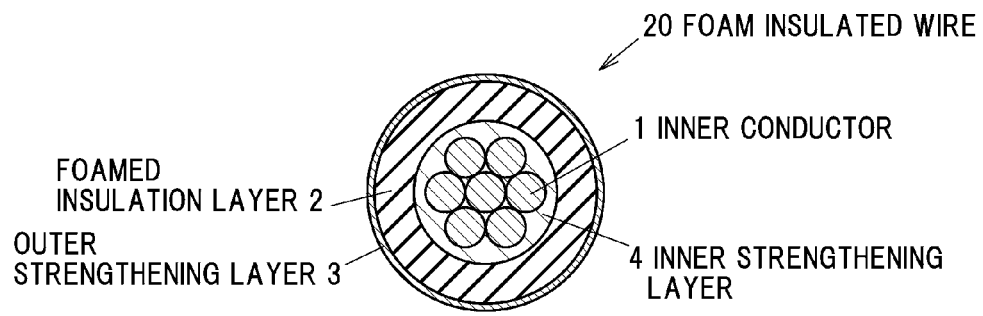
FIG. 3 is a cross sectional view showing a cross-section structure of a foam insulated wire in a modification of FIG. 2.
Figure 4:
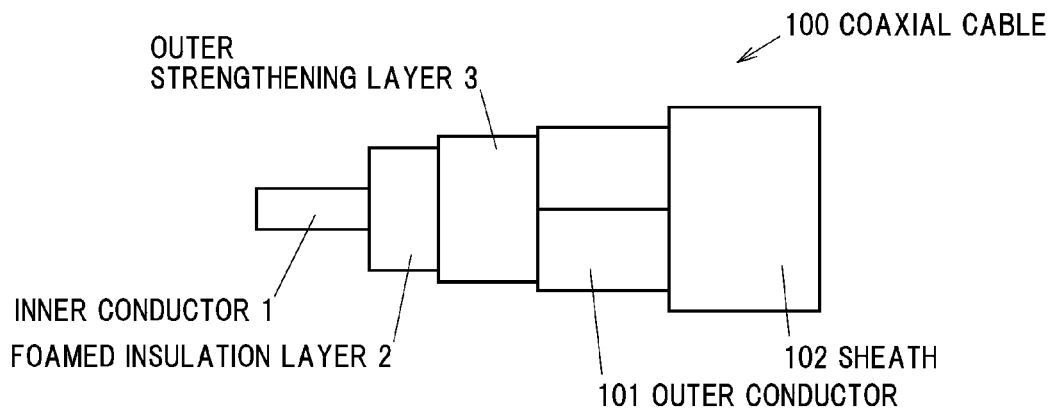
FIG. 4 is a longitudinal side view showing a coaxial cable in the first embodiment of the invention.

FIG. 2 is a cross sectional view showing a cross-section structure of a foam insulated wire in a first embodiment of the invention. FIG. 3 is a cross sectional view showing a cross-section structure of a foam insulated wire in a modification of FIG. 2. In addition, FIG. 4 is a longitudinal side view showing a coaxial cable in the first embodiment of the invention.

A foam insulated wire 10 is formed by covering an outer periphery of an inner conductor (twisted wire) 1 with a foamed insulation layer 2 formed of the foamed resin molded article in the embodiment of the invention. If necessary, it is possible to provide an outer strengthening layer 3 on an outer side of the foamed insulation layer 2, as shown in FIG. 2. In addition, if necessary, it is possible to provide an inner strengthening layer 4 on an inner side of the foamed insulation layer 2 as is a foam insulated wire 20 shown in FIG. 3.

It is possible to use a copper wire or a silver-plated wire as the inner conductor 1. The inner conductor 1 is not limited to the twisted wire shown in FIG. 2 and may be a solid wire.

As a material of the outer strengthening layer 3 and the inner strengthening layer 4, it is possible to use, e.g., FEP, PFA and ETFE.

A coaxial cable 100 is formed by providing an outer conductor 101 on an outer periphery of the outer strengthening layer 3 of the foam insulated wire 10 and further covering an outer periphery thereof with a sheath 102.

It is possible to provide the outer conductor 101 by, e.g., longitudinally wrapping (so-called cigarette wrap) a copper tape or an aluminum/nylon laminated tape. It may be helical wrapping instead of longitudinal wrapping. In addition to the tape-shaped material, it is possible to alternatively use a copper corrugated pipe, an aluminum straight pipe, an aluminum corrugated pipe, copper wire braid, tin-plated copper wire braid and silver-plated copper wire braid, etc.

The sheath 102 can be formed of, e.g., polyvinyl chloride, polyethylene or flame-retardant polyethylene.

Although the cable is formed using only one foam insulated wire 10 in FIG. 4, it is possible to form the cable by covering a group of plural foam insulated wires 10 with an outer conductor and a sheath.

Second Embodiment of the Invention

Figure 5:
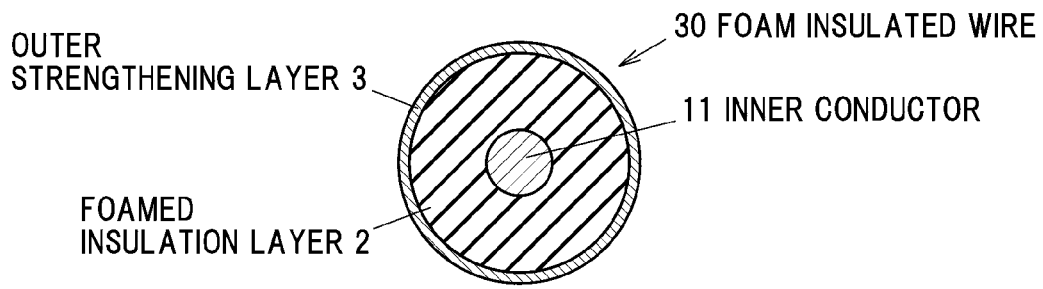
FIG. 5 is a cross sectional view showing a cross-section structure of a foam insulated wire in a second embodiment of the invention.
Figure 6:
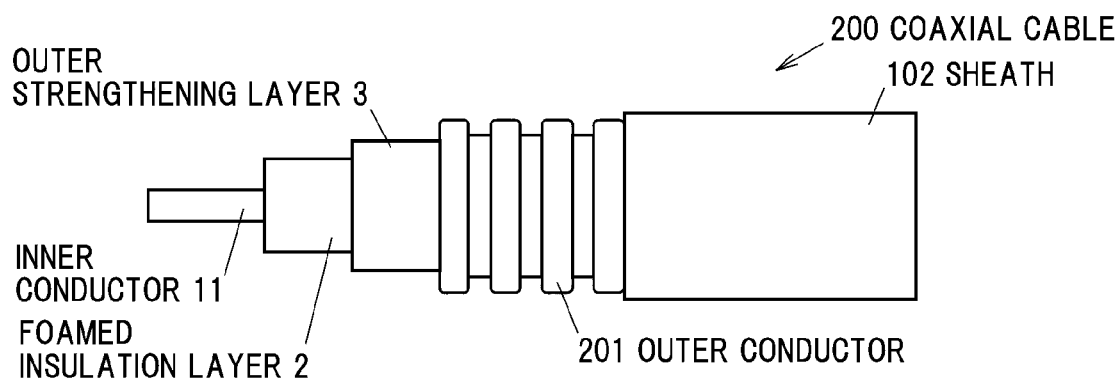
FIG. 6 is a longitudinal side view showing a coaxial cable in the second embodiment of the invention.
Figure 7:
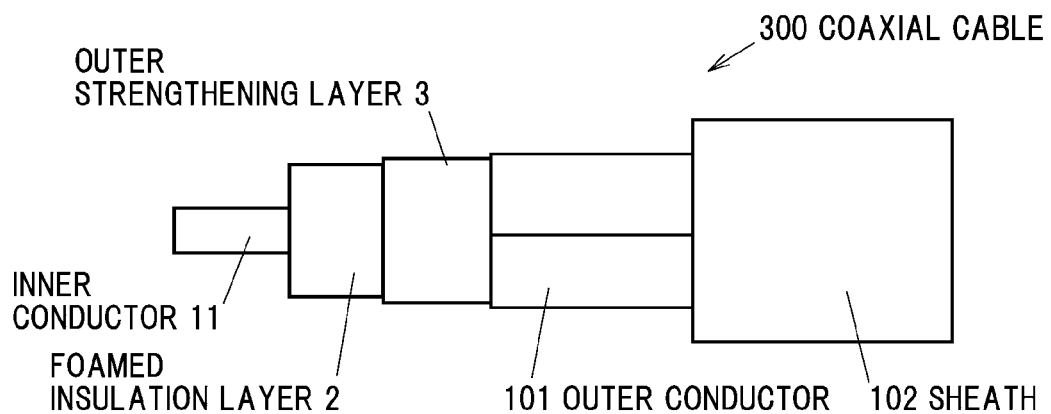
FIG. 7 is a longitudinal side view showing a coaxial cable in a modification of FIG. 6.

FIG. 5 is a cross sectional view showing a cross-section structure of a foam insulated wire in a second embodiment of the invention. FIG. 6 is a longitudinal side view showing a coaxial cable in the second embodiment of the invention. In addition, FIG. 7 is a longitudinal side view showing a coaxial cable in a modification of FIG. 6.

A foam insulated wire 30 shown in FIG. 5 is different from the foam insulated wire of the first embodiment only in that an inner conductor (solid wire) 11 is used in place of the inner conductor (twisted wire) 1.

A coaxial cable 200 shown in FIG. 6 is formed by providing an outer conductor 201 on an outer periphery of the outer strengthening layer 3 of the foam insulated wire 30 and further covering an outer periphery thereof with the sheath 102. Although the outer conductor 201 shown in FIG. 6 is a copper corrugated pipe, the sheath 102 may be a longitudinally wrapped copper tape, etc., as is a coaxial cable 300 shown in FIG. 7 in the same manner as the first embodiment (FIG. 4).

Third Embodiment of the Invention

Figure 8:
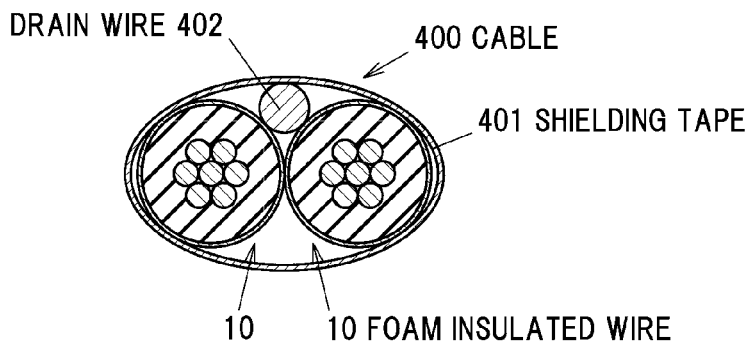
FIG. 8 is a cross sectional view showing a cross-section structure of a cable in a third embodiment of the invention.
Figure 9:
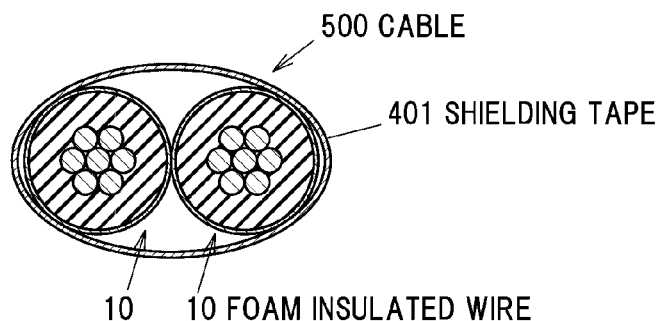
FIG. 9 is a cross sectional view showing a cross-section structure of a cable in a modification of FIG. 8.

FIG. 8 is a cross sectional view showing a cross-section structure of a cable in a third embodiment of the invention. FIG. 9 is a cross sectional view showing a cross-section structure of a cable in a modification of FIG. 8.

A cable 400 shown in FIG. 8 has a structure in which two parallel foam insulated wires 10 and a drain wire 402 placed therebetween along a longitudinal direction of a cable are covered all together with a shielding tape 401.

A cable 500 shown in FIG. 9 is different from the cable 400 in that the drain wire 402 is not provided.

As a material of the shielding tape 401, it is possible to use materials which are generally used for a cable.

Fourth Embodiment of the Invention

Figure 10:
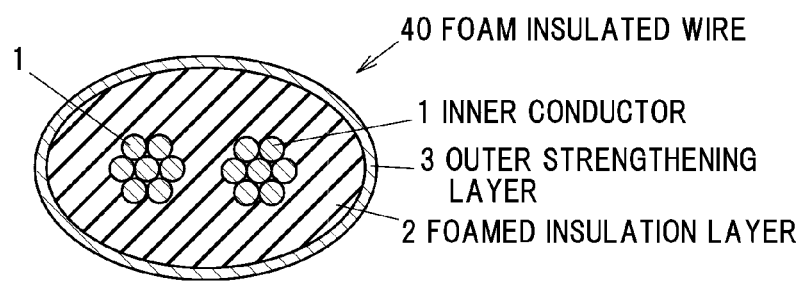
FIG. 10 is a cross sectional view showing a cross-section structure of a foam insulated wire in a fourth embodiment of the invention.
Figure 11:
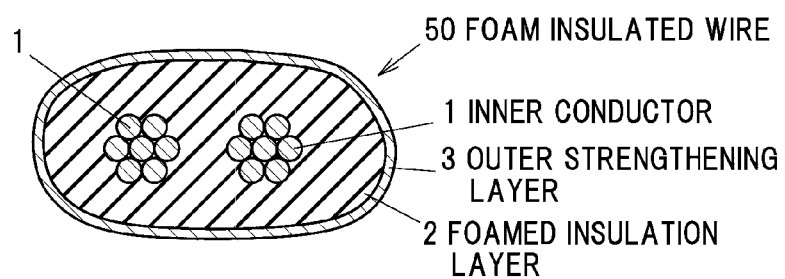
FIG. 11 is a cross sectional view showing a cross-section structure of a foam insulated wire in a modification of FIG. 10.

FIG. 10 is a cross sectional view showing a cross-section structure of a foam insulated wire in a fourth embodiment of the invention. FIG. 11 is a cross sectional view showing a cross-section structure of a foam insulated wire in a modification of FIG. 10.

A foam insulated wire 40 shown in FIG. 10 is different from the foam insulated wire of the first embodiment (FIG. 2) in that two inner conductors (twisted wires) 1 arranged in parallel are covered all together with the foamed insulation layer 2 having an ellipse cross section which is long in an arranging direction of the two inner conductors 1.

Meanwhile, a foam insulated wire 50 shown in FIG. 11 does not have an ellipse cross section but has a track-shaped oval cross section having flat portions parallel to the arranging direction of the two inner conductors 1.

Fifth Embodiment of the Invention

FIG. 12 is a cross sectional view showing a cross-section structure of a foam insulated wire in a fifth embodiment of the invention. FIG. 13 is a cross sectional view showing a cross-section structure of a foam insulated wire in a modification of FIG. 12.

A foam insulated wire 60 shown in FIG. 12 is different from the foam insulated wire of the second embodiment (FIG. 5) in that two inner conductors (solid wires) 11 arranged in parallel are covered all together with the foamed insulation layer 2 having an ellipse cross section which is long in an arranging direction of the two inner conductors 11.

Meanwhile, a foam insulated wire 70 shown in FIG. 13 does not have an ellipse cross section but has a track-shaped oval cross section having flat portions parallel to the arranging direction of the two inner conductors 11.

Method of Manufacturing Foam Insulated Wire and Cable

It is possible to manufacture the foam insulated wire and the cable in the embodiments of the invention by a known method of manufacturing a foam insulated wire and a cable, except that the foamed resin molded article in the embodiment of the invention is used as an insulation layer of the insulated wire. At this time, the extruder of the outer strengthening layer preferably has a cylinder temperature of 230° C. to 350° C. and a head temperature of 310° C. to 350° C. An extruding method may be a two-layer simultaneous extruding method in which the foamed insulation layer and the outer strengthening layer are simultaneously extruded, or a two-layer common extruding method in which the two layers are separately extruded.

Effects of the Embodiments of the Invention

In the embodiments, it is possible to provide a foamed resin molded article manufactured by foaming a fluorine resin using a chemical foaming method, a foam insulated wire, a cable and a method of manufacturing a foamed resin molded article. Furthermore, the following effects are achieved.

(1) According to the foam insulated wire and the cable having the insulation layer formed of the foamed resin molded article in the embodiment, thin foam insulated wire and cable which are excellent in characteristics such as characteristic impedance, solder dip resistance, a deformation ratio and a pull-out force are obtained.

(2) According to the foam insulated wire and the cable having the insulation layer formed of the foamed resin molded article in the embodiment, thick foam insulated wire and cable which are excellent in characteristics such as attenuation, a VSWR, characteristic impedance, solder dip resistance, a deformation ratio and a pull-out force are obtained.

EXAMPLES

Preparation of Pellets

Pellets containing fluorine resin powder, chemical blowing agent powder and foam nucleating agent powder were made in accordance with the proportion of ingredients listed in Table 1. The materials used are as follows.

Fluorine Resin

FEP: Trade name NP21, manufactured by Daikin Industries, Ltd.

PFA: Trade name AP210, manufactured by Daikin Industries, Ltd.

Chemical Blowing Agent

Azo compound: azodicarbonamide (ADCA), Trade name VINYFOR AC#3, manufactured by Eiwa Chemical Ind. Co., Ltd.

Hydrazide compound: 4,4'-oxybis(benzenesulfonyl hydrazide (OBSH), Trade name NEOCELLBORN #1000S, manufactured by Eiwa Chemical Ind. Co., Ltd.

Tetrazole compound: bistetrazole diammonium (BHT-$2NH_3$), Trade name CELLTETRA, manufactured by Eiwa Chemical Ind. Co., Ltd.

Foam Nucleating Agent

Boron nitride: Trade name BORON NITRIDE (BN), Grade (SP2), manufactured by Denki Kagaku Kogyo Kabushiki Kaisha Talc: Trade name D1000, manufactured by Nippon Talc Co., Ltd.

In detail, a chemical blowing agent was added to powder of FEP or PFA and mixed by a high speed flow type mixer (Trade name: SUPERMIXER PICCOLO SMP-2, manufactured by KAWATA MFG Co., Ltd.) at a mixing blade rotational speed of 50 rpm for 5 minutes.

In some Examples, the chemical blowing agent was added together with the foam nucleating agent and then mixed. After that, the mixed powder was pelletized using a small tablet press (Type: HP-AR-SS, manufactured by Hata Iron Works Co., Ltd.) under conditions of 15 tableting pestles, a tablet diameter (pellet diameter) of 5 φmm, tableting pressure of 30 MPa, and tablet press revolution of 50 rpm.

In Examples 7, 14, 21 and 28, pellets as a master batch (MB1 and MB2) were made by the same procedure, and the fluorine resin as a base resin was also pelletized by the same procedure.

MB1: 90 mass % of FEP+10 mass % of azo compound (ADCA)

MB2: 90 mass % of PFA+10 mass % of azo compound (ADCA)

Meanwhile, by using high-density polyethylene (HDPE) (Trade name: HI-ZEX 5305E (HI-ZEX is a trademark), manufactured by Prime Polymer Co., Ltd.) in place of FEP and PFA, pellets for Comparative Examples were made in the same manner as Examples.

Manufacturing of Thin Foam Insulated Wire/Cable

The obtained pellets (in Examples 7 and 14, the pellets as a master batch and the pelletized base resin) were kneaded, foamed and extruded as a foamed insulation layer to cover an inner conductor, thereby manufacturing high-speed transmission thin foam insulated wire and cable as Examples.

FIG. 14 is a schematic view showing a production line for manufacturing a thin foam insulated wire in Examples. The inner conductor was fed by a feeder 21 and was passed through a core heater 23 using two accumulators 22 provided on a production line, and subsequently, an outer periphery of the inner conductor was covered with a foamed insulation layer at an extruder 24 and, at the same time, an outer periphery of the foamed insulation layer was covered with an outer strengthening layer at an outer strengthening layer extruder 25 (two-layer simultaneous extruding method).

A twisted wire (copper wire) of 7/0.127 φmm was used as the inner conductor. Meanwhile, FEP (Trade name NP101, manufactured by Daikin Industries, Ltd.) was used as a material of the outer strengthening layer. A diameter of the foamed insulation layer was 1.0±0.04 φmm. The foamed insulation layer was formed to have a degree of foaming of 60±5% and characteristic impedance of 50±2Ω.

For extrusion using FEP, temperature of the extruder 24 was adjusted to a cylinder temperature of 230° C. to 320° C., a head temperature of 320° C. and a nozzle temperature of 320° C. Meanwhile, for extrusion using PFA, temperature was adjusted to a cylinder temperature of 260° C. to 350° C., a head temperature of 350° C. and a nozzle temperature of 340° C. The temperature of the outer strengthening layer extruder 25 was adjusted to a cylinder temperature of 230° C. to 320° C. and a head temperature of 320° C. The extruders used were a 40-mm extruder as the extruder 24 and a 28-mm extruder as the outer strengthening layer extruder 25. In the both extruders, L/D was 25 and a full flight screw was used. In addition, a screw rotation speed of the extruder 24 was 20 rpm and that of the outer strengthening layer extruder 25 was 8 rpm.

The conductor covered with the outer strengthening layer was passed through a cooling bath (water tank) 26 and was wound onto a winder 29 via a haul-off machine 28, thereby manufacturing 1000 m of foam insulated wire.

After shielding the manufactured foam insulated wire by longitudinally wrapping an aluminum/nylon laminated tape, a polyvinyl chloride sheath was extrusion-molded on an outer periphery thereof, thereby manufacturing a high-speed transmission thin cable.

Evaluation of Thin Foam Insulated Wire/Cable

Quality of the foamed insulation layer just after manufacturing the foam insulated wire was judged based on an outer diameter and capacitance (C) as inline measurement values at the time of extrusion, and also a degree of foaming which is derived from the outer diameter and the capacitance. The measurement methods are as described below and the measurement results are shown in Table 1.

The outer diameter of the foamed insulation layer was measured using an inline outer diameter gauge 27 (2-axis outside diameter laser micrometer manufactured by Takikawa Engineering Co., Ltd.) in the extruder.

The capacitance of the foamed insulation layer was measured using an inline capacitance meter 26a (capacitance monitor manufactured by BETA LaserMike) in the extruder.

The degree of foaming of the foamed insulation layer was calculated based on inline data in a computer (PC) controlling the extruder and was recorded.

The outer diameter, the capacitance and the degree of foaming were recorded to a data logger, and respective maximum and minimum values of the manufactured 1000-m cable were derived.

In addition, an average bubble size was measured as follows. After cutting the 1000-m foam insulated wire every 100 m, cross sections were photographed by an electronic microscope with 50 magnifications, and air bubbles on each cross section were converted into an equivalent circle diameter by using an image processing software "winROOF" (manufactured by Mitani Corporation). The measurement results are shown in Table 1.

The average bubble size of the foamed insulation layer needs to be not more than 100 μm. When the insulation layer is thin as is in the thin foam insulated wire of the present example, large variation in the bubble size leads to outside diameter variation, resulting in large variation in characteristic impedance.

The quality of the manufactured cable was judged based on the results of characteristic impedance (50±2Ω), solder dip resistance, a deformation ratio and a pull-out force measured on the foam insulated wire. The measurement methods are as described below and the measurement results are shown in Table 1.

The characteristic impedance of the obtained thin cable was measured by a TDR method using an impedance analyzer E4991A manufactured by Agilent Technologies. 50±2Ω was regarded as acceptable.

FIGS. 16A to 16C are explanatory diagrams illustrating a method of measuring solder dip resistance of the foam insulated wire. The foamed insulation layer 2 was peeled off from the tip of the foam insulated wire to a position of 12.7 mm (a length A in FIG. 16A) to expose the inner conductor 1. After that, the foam insulated wire was bent 90 degrees at a position 25.4 mm from the tip (a length B in FIG. 16A), thereby making a sample (five samples were made). A solder bath 41 was pre-heated to 270° C., and the exposed inner conductor 1 of the aforementioned sample was dipped 10 mm from the end portion (a length C in FIG. 16B) in solder bath (270° C.) for 10 seconds. The sample was taken out after 10 seconds, and a shrinking distance (a length D in FIG. 16C) of the foamed insulation layer 2 was measured. The shrinking amount within 5 mm was regarded as acceptable.

Figure 17A:
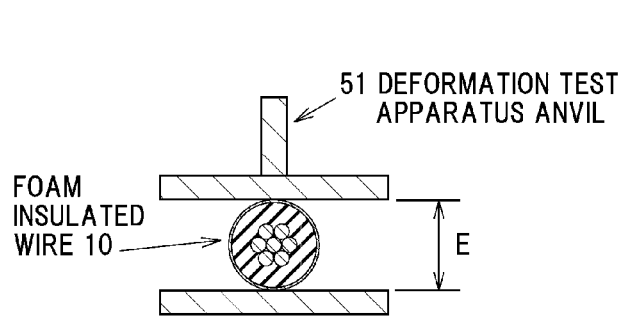
FIGS. 17A and 17B are explanatory diagrams illustrating a method of measuring a deformation ratio of the foam insulated wire.
Figure 17B:
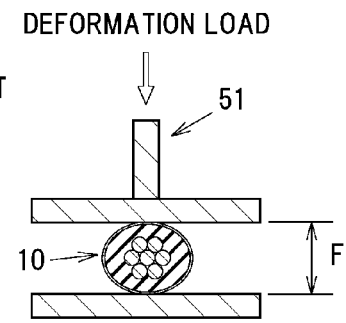

FIGS. 17A and 17B are explanatory diagrams illustrating a method of measuring a deformation ratio of the foam insulated wire. 5N of deformation load is applied to the foam insulated wire 10 using a heat deformation tester (a deformation test apparatus anvil (pressing jig) 51), a deformation amount of the foam insulated wire was measured after 10 minutes, and a deformation ratio was derived by the following formula. Not more than 20% of deformation ratio was regarded as acceptable.

Deformation ratio(%)=[(E−F)/(E−X)]×100

E: Initial diameter of Foam insulated wire (a length E in FIG. 17A)

F: Diameter of Foam insulated wire after deformation (a length F in FIG. 17B)

X: Diameter of Inner conductor

Figure 18A:
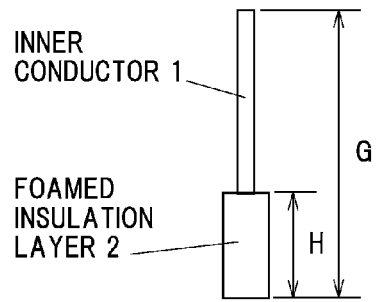
FIGS. 18A and 18B are explanatory diagrams illustrating a method of measuring a pull-out force of the foam insulated wire.
Figure 18B:
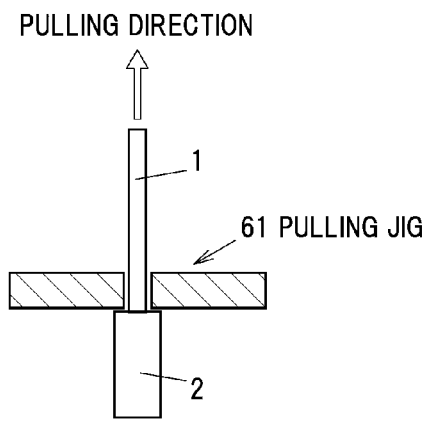

FIGS. 18A and 18B are explanatory diagrams illustrating a method of measuring a pull-out force of the foam insulated wire.

The foam insulated wire was cut into a length of 100 mm (a length G in FIG. 18A) and the inner conductor was exposed while leaving 5 mm of the foamed insulation layer 2 (a length H in FIG. 18A). The exposed inner conductor was passed through a hole formed on a steel sheet and having a diameter 0.2 mm larger than the diameter of the inner conductor and was placed on a tensile tester (a pulling jig 61), and then, pull-out load when pulling the wire at a speed of 200 mm/min was measured and the maximum value was defined as a pull-out force. The pull-out force of not less than 10N was regarded as acceptable.

TABLE 1

Composition of foamed insulation layer of thin foam insulated wire and measurement results of characteristics

| | (Unit: mass %) | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|
| Fluorine resin | FEP (NP21) | 99 | 99 | 99 | 99 | 98.5 | 98.5 | 90 | — | — | — | — | — | — | — |
| | PFA (AP210) | — | — | — | — | — | — | — | 99 | 99 | 99 | 99 | 98.5 | 98.5 | 90 |
| Chemical blowing agent | Azo compound (ADCA) | 1 | — | — | 0.5 | 1 | 1 | — | 1 | — | — | 0.5 | 1 | 1 | — |
| | Hydrazide compound (OBSH) | — | 1 | — | 0.5 | — | — | — | — | 1 | — | 0.5 | — | — | — |
| | Tetrazole compound (BHT—2NH$_3$) | — | — | 1 | — | — | — | — | — | — | 1 | — | — | — | — |
| MB | MB1 | — | — | — | — | — | — | 10 | — | — | — | — | — | — | — |
| | MB2 | — | — | — | — | — | — | — | — | — | — | — | — | — | 10 |
| Foam nucleating agent | Boron nitride | — | — | — | — | 0.5 | — | — | — | — | — | — | 0.5 | — | — |
| | Talc | — | — | — | — | — | 0.5 | — | — | — | — | — | — | 0.5 | — |

TABLE 1-continued

Composition of foamed insulation layer of thin foam insulated wire and measurement results of characteristics

| (Unit: mass %) | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|
| Characteristics [ ] = Acceptability criteria | Outer diameter of insulation layer (φ mm) 1.00 ± 0.04 | 1.02 | 1.03 | 1.02 | 1.01 | 1 | 0.99 | 1.02 | 0.97 | 1.03 | 1.04 | 1.02 | 1 | 1.01 | 1.02 |
| | Degree of foaming of insulation layer (%) | 58.7 | 58 | 58 | 59.2 | 60.64 | 61.2 | 58.7 | 62.4 | 58.3 | 56.5 | 58.4 | 64 | 59.3 | 58.7 |
| | Average bubble size (equivalent circle diameter φ μm) | 70 | 95 | 85 | 75 | 55 | 57 | 72 | 70 | 98 | 88 | 79 | 60 | 62 | 75 |
| | Characteristic impedance (Ω) [50 ± 2] | 50.7 | 51.2 | 50.3 | 50.2 | 50.06 | 49.6 | 50.7 | 48.79 | 51.2 | 51.4 | 50.3 | 50.7 | 50.2 | 50.5 |
| | Solder dip resistance (260° C. × 10 sec) [Shrinkage ≤ 5 mm] | 1.3 | 1.4 | 1.3 | 1.3 | 1.2 | 1.1 | 1.3 | 0.7 | 0.9 | 0.7 | 0.8 | 0.5 | 0.5 | 0.8 |
| | Deformation ratio (5N × 10 min) [≤20%] | 8.5 | 15 | 9.5 | 8.2 | 6 | 6.1 | 8.3 | 6.5 | 16.2 | 8 | 7.3 | 6.5 | 6.2 | 9.2 |
| | Pull-out force (25 mm) [≥10N] | 16 | 12 | 15 | 16 | 18 | 17 | 14 | 14 | 12 | 15 | 14 | 17 | 18 | 16 |

Ex.: Example

In Examples 1 to 7 shown in Table 1, FEP is used as a base resin.

In Examples 1, 1.0 mass % of ADCA, which is an azo compound, was added as a chemical blowing agent. Use of ADCA which generates a large amount of cracked gas and is highly effective as a foam nucleating agent to be a source of air bubble generation provides small bubble size, stable outer diameter and characteristic impedance within the acceptable range. In addition, the results for the solder dip resistance, the deformation ratio and the pull-out force were also acceptable.

In Example 2, 1.0 mass % of OBSH, which is a hydrazide compound, was added as a chemical blowing agent. Use of OBSH which generates a large amount of cracked gas but is less effective as a foam nucleating agent resulted in large bubble size. This caused large variation in outer diameter, however, the characteristic impedance was within the acceptable range and the results for the solder dip resistance, the deformation ratio and the pull-out force were all acceptable.

In Example 3, 1.0 mass % of bistetrazole diammonium, which is a tetrazole compound, was added as a chemical foaming agent. Although the amount of cracked gas was large, the bubble size was relatively large since the effect as a foam nucleating agent is less than ADCA. The variation in outer diameter was also relatively large, however, the characteristic impedance was within the standard and the results for the solder dip resistance, the deformation ratio and the pull-out force were all acceptable.

In Example 4, ADCA and OBSH were used at a mixing ratio of 1:1. Since ADCA is highly effective as a foam nucleating agent, the bubble size was small and the variation in outer diameter was also small. Therefore, the degree of foaming and the characteristic impedance were both within the standards and the results for the solder dip resistance, the deformation ratio and the pull-out force were all acceptable.

In Example 5, ADCA was used as a chemical foaming agent and 0.5 mass % of BN was added as a foam nucleating agent. The bubble size was further reduced due to the effect of the foam nucleating agent, and as a result, the variation in outer diameter was small, the degree of foaming and the characteristic impedance were both within the standards and the results for the solder dip resistance, the deformation ratio and the pull-out force were all acceptable.

In Example 6, talc was used as a nucleating agent. Due to the effect of the foam nucleating agent, the bubble size was small, the degree of foaming and the characteristic impedance were both within the standards and the results for the solder dip resistance, the deformation ratio and the pull-out force were all acceptable in the same manner as the case of using BN.

In Example 7, a master batch containing 10 mass % of ADCA added as a chemical foaming agent and FEP pellets were loaded together in an extruder and were dispersively mixed so as to have a blowing agent concentration of 1.0 mass %. There was no difference in the extruded formed insulation between the case of using a pelletized mixture of resin powder and chemical foaming agent powder and the case of making a master batch and then mixing with resin pellets, the bubble size was small and the variation in outer diameter was also small. As s result, the degree of foaming and the characteristic impedance were both within the standards and the results for the solder dip resistance, the deformation ratio and the pull-out force were all acceptable.

In Examples 8 to 14 shown in Table 1, PFA is used as a base resin.

In Examples 8, 1.0 mass % of ADCA was added as a chemical blowing agent. The amount of cracked gas was large, the bubble size was small since it is highly effective as a foam nucleating agent, and the variation in outer diameter was also small. As a result, the degree of foaming and the characteristic impedance were both within the standards, almost no shrinkage occurred since PFA having a high melting point of 310° C. was used, and the results for the deformation ratio and the pull-out force were both acceptable.

In Example 9, OBSH was used as a blowing agent. The bubble size was large since OBSH is less effective as a foam nucleating agent, and as a result, the variation in outer diameter was large. However, the degree of foaming and the characteristic impedance were both within the standards, the solder dip resistance was not more than the melting point, and the results for the deformation rate and the pull-out force were within the defined range and were acceptable even though the values thereof were deteriorated due to the large bubble size.

In Example 10, bistetrazole diammonium was used as a chemical blowing agent. Although the amount of cracked gas was large, the bubble size was large since it is less effective as a foam nucleating agent. This causes large variation in outer diameter, however, the degree of foaming and the characteristic impedance were within the standards and the results for the solder dip resistance, the deformation ratio and the pull-out force were all acceptable.

In Example 11, ADCA and OBSH were used at a mixing ratio of 1:1. Since ADCA is highly effective as a foam nucleating agent, the bubble size was small, the variation in outer diameter was also small, the degree of foaming and the characteristic impedance were both within the standards and the results for the solder dip resistance, the deformation ratio and the pull-out force were also acceptable.

In Example 12, 0.5 mass % of BN as a nucleating agent was added in addition to ADCA as a chemical blowing agent. The bubble size was very small due to the effect of BN as a foam nucleating agent. As a result, the variation in outer diameter was small, the degree of foaming and the characteristic impedance were within the standards and the results for the solder dip resistance, the deformation ratio and the pull-out force were all acceptable.

In Example 13, talc was used as a nucleating agent. Since talc is highly effective as a foam nucleating agent in the same manner as BN, the bubble size was small and the variation in outer diameter was small. Therefore, the degree of foaming and the characteristic impedance were both within the standards and the results for the solder dip resistance, the deformation ratio and the pull-out force were all acceptable.

In Example 14, a master batch containing 10 mass % of ADCA added as a chemical blowing agent and PFA pellets were loaded together in an extruder and were dispersively mixed so as to have a foaming agent concentration of 1.0 mass %. There was no difference in the extruded formed insulation between the case of using a pelletized mixture of resin powder and chemical blowing agent powder and the case of making a master batch and then mixing with resin pellets, the bubble size was small and the variation in outer diameter was also small. As s result, the degree of foaming and the characteristic impedance were both within the standards and the results for the solder dip resistance, the deformation ratio and the pull-out force were all acceptable.

Comparative Example of Thin Foam Insulated Wire/Cable

Comparative Example 1 is not the pelletization without heating and melting, but is an example of heat-melting in which FEP (Trade name: NP21) is used as a fluorine resin and azodicarbonamide (ADCA) (Trade name: VINYFOR AC#3, manufactured by Eiwa Chemical Ind. Co., Ltd.) which is an azo compound is used as a chemical blowing agent. The chemical foaming agent was decomposed when FEP (99 mass %) and ADCA (1 mass %) as a chemical blowing agent were melt-kneaded, and it was not possible to carry out foam extrusion.

In Comparative Example 2, pellets formed as Comparative Example using HDPE (99 mass %) and ADCA (1 mass %) were kneaded, foamed and extruded as an foamed insulation layer to cover the inner conductor, and thin foam insulated wire and cable as Comparative Example were made in the same manner as Examples. Since HDPE has a low melting point of 135° C., the result for the solder dip resistance was a very large shrinking amount of 10 mm and was not acceptable.

Comparative Example 3 is an example of the physical foaming method in which boron nitride (0.5 mass %) as a foam nucleating agent is mixed to FEP (99.5 mass %) and nitrogen gas is used as a foaming agent at an injection pressure of 45 MPa. The full-compound method was used. It was not possible to control the bubble size, resulting in a large bubble size of 150 μm. As a result, even though the characteristic impedance was within the acceptable range, the deformation ratio of 25% and the small pull-out force of 7N were not acceptable. Note that, in Comparative Examples 3 and 4 to 6, a 20-mm counter-rotating twin-screw extruder manufactured by Toyo Seiki Co., Ltd. was used at a cylinder temperature of 270 to 350° C. and a head temperature of 320 to 350° C.

Comparative Examples 4 to 6 are an example of the physical foaming method in which boron nitride (0.5 mass %) as a foam nucleating agent is mixed to an engineering plastic (99.5 mass %) as a base resin and nitrogen gas is used as a foaming agent at an injection pressure of 44 to 46 MPa (Comparative Example 4: 44 MPa, Comparative Example 5: 44 MPa, Comparative Example 6: 46 MPa). The full-compound method was used. Although each melting point is high, a dielectric constant after foaming is high such as 3.3 to 3.6. Therefore, the result for the characteristic impedance was not acceptable.

The engineering plastics used are as follows.

Comparative Example 4: Polyamide Nylon 66 (Trade name: Maranyl A125J, manufactured by Unitika Ltd.)

Comparative Example 5: Polyether ether ketone (Trade name: 381G, manufactured by Vitrex)

Comparative Example 6: Polybutylene terephthalate (Trade name: TORAYCON 1401-X06, manufactured by Toray Industries, Inc.)

Manufacturing of Thick Foam Insulated Wire/Cable

Next, the obtained pellets (in Examples 21 and 28, the pellets as a master batch and the pelletized base resin) were kneaded, foamed and extruded as an foamed insulation layer to cover the inner conductor, thereby manufacturing thick high-frequency foam insulated wire and cable.

FIG. 15 is a schematic view showing a production line for manufacturing a thick foam insulated wire in Examples. The inner conductor was fed by a feeder (wheel) 31 and was passed through a wire drawing machine 32 and the core heater 23, and subsequently, an outer periphery of the inner conductor was covered with a foamed insulation at by the extruder 24 and, at the same time, an outer periphery of the foamed insulation layer was covered with an outer strengthening layer at the outer strengthening layer extruder 25 (two-layer simultaneous extruding method).

A solid wire (copper wire) having a diameter of 0.96 φmm was used as the inner conductor. A diameter of the foamed insulation layer was 2.65±0.1 φmm. The foamed insulation layer was formed to have a degree of foaming of 45±2% and characteristic impedance of 50±1Ω.

For extrusion using FEP, temperature of the extruder 24 was adjusted to a cylinder temperature of 230° C. to 320° C., a head temperature of 320° C. and a nozzle temperature of 320° C. Meanwhile, for extrusion using PFA, temperature was adjusted to a cylinder temperature of 260° C. to 350° C., a head temperature of 350° C. and a nozzle temperature of 340° C. The temperature of the outer strengthening layer extruder 25 was adjusted to a cylinder temperature of 230° C. to 320° C. and a head temperature of 320° C. The extruders used were a 50-mm extruder as the extruder 24 and a 28-mm extruder as the outer strengthening layer extruder 25. In the both extruders, L/D was 25 and a full flight screw was used. In addition, a screw rotation speed of the extruder 24 was 25 rpm that of the outer strengthening layer extruder 25 was 12 rpm.

The conductor covered with the outer strengthening layer was passed through the cooling bath (water tank) 26 and was wound onto the winder 29 via the haul-off machine 28, thereby manufacturing 1000 m of foam insulated wire.

An outer conductor was formed by covering the manufactured foam insulated wire with a copper tape in a corrugated manner and a polyethylene sheath was further extruded on an outer periphery thereof, thereby manufacturing a 100-m thick 3D coaxial cable.

Evaluation of Thick Foam Insulated Wire/Cable

Quality of the foamed insulation layer just after manufacturing the foam insulated wire was judged based on an outer diameter and capacitance (C) as inline measurement values at the time of extrusion, and also a degree of foaming which is derived from the outer diameter and the capacitance, in the same manner as the thin foam insulated wire. The measurement and calculation methods are as described above and the measurement results are shown in Table 2.

In addition, the 100-m foam insulated wire was cut every 10 m and an average bubble size was measured using an image processing software in the same manner as the thin foam insulated wire.

Large variation in the bubble size leads to outside diameter variation in the same manner as the thin foam insulated wire, resulting in that variation in characteristic impedance is more than 1Ω which is not acceptable. The average bubble size needs to be not more than 200 μm in order to fall within 1Ω.

The quality of the manufactured cable was judged based on the results of the characteristic impedance (50±1Ω), the solder dip resistance, the deformation ratio, the pull-out force, attenuation and a voltage standing wave ratio (VSWR) measured on the foam insulated wire. As acceptability criteria, the standards of especially the characteristic impedance, the attenuation and the VSWR should be satisfied.

Methods of measuring the characteristic impedance (50±1Ω), the solder dip resistance, the deformation ratio and the pull-out force are as described above. However, while the characteristic impedance of the thin foam insulated wire was measured by the TDR method, that of the thick foam insulated wire was measured by the Smith chart method and 50±1Ω was regarded as acceptable. In addition, since the insulation layer is thicker than that of the thin wire, load applied in the test for deformation ratio was changed to 20N. The measurement results are shown in Table 2.

Figure 19:
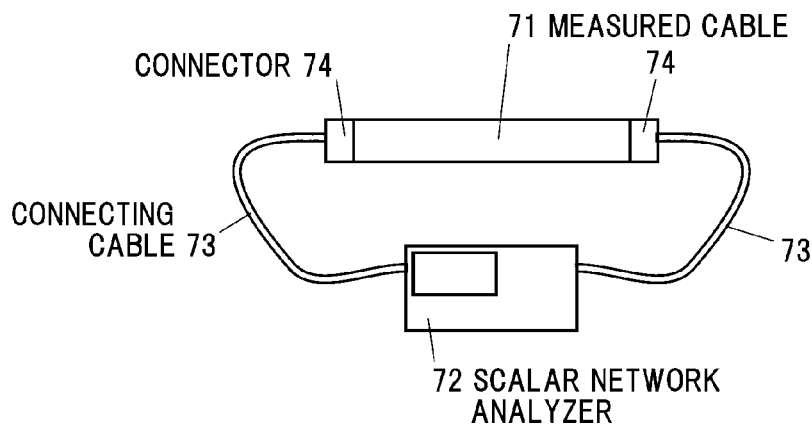
FIG. 19 is an explanatory diagram illustrating a method of measuring attenuation of a foamed coaxial cable.

FIG. 19 is an explanatory diagram illustrating a method of measuring attenuation of a foamed coaxial cable.

For measurement of attenuation, a scalar network analyzer 72 (8753ES, manufactured by Agilent Technologies) was used. The scalar network analyzer 72 was connected to both ends of a measured cable 71 via connecting cables 73 and connectors 74. Note more than 48.9 dB/100 m of attenuation at 2 GHz was regarded as acceptable.

Figure 20:
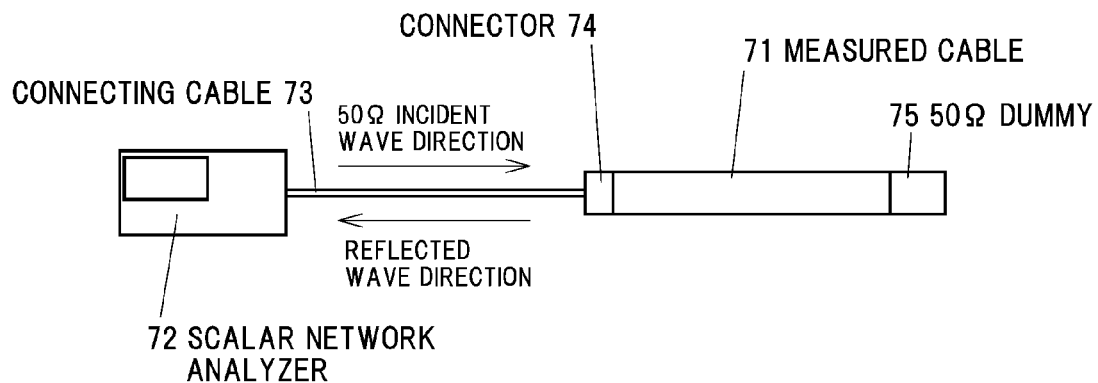
FIG. 20 is an explanatory diagram illustrating a method of measuring a voltage standing wave ratio (VSWR) of the foamed coaxial cable.

FIG. 20 is an explanatory diagram illustrating a method of measuring a voltage standing wave ratio (VSWR) of the foamed coaxial cable. For measurement of VSWR which is an index of stability in a length direction of the cable, the same measuring instrument as that for measuring the attenuation (the scalar network analyzer 72) was used. The scalar network analyzer 72 was connected to one end of the measured cable 71 via the connecting cable 73 and the connector 74, and a 50Ω resistor (a 50Ω dummy 75) was attached to another end of the measured cable 71. A 50Ω signal was input from the end connected to the scalar network analyzer 72 and a ratio of reflected signal was measured. When variation in air bubbles, etc., is present in the measured cable 71, a reflected wave (standing wave) is generated. As a result, the VSWR becomes larger than 1. The closer to 1 the VSWR is, the more stable it is. Thus, not more than 1.1 which is the standard was regarded as acceptable.

TABLE 2

Composition of foamed insulation layer of thick foam insulated wire and measurement results of characteristics

| (Unit: mass %) | | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|---|---|---|---|---|
| Fluorine resin | FEP (NP21) | 99.5 | 99.5 | 99.5 | 99.5 | 99 | 99 | 95 | — | — | — | — | — | — | — |
| | PFA (AP210) | — | — | — | — | — | — | — | 99.5 | 99.5 | 99.5 | 99.5 | 99 | 99 | 95 |
| Chemical blowing agent | Azo compound (ADCA) | 0.5 | — | — | 0.25 | 0.5 | 0.5 | — | 0.5 | — | — | 0.25 | 0.5 | 0.5 | — |
| | Hydrazide compound (OBSH) | — | 0.5 | — | 0.25 | — | — | — | — | 0.5 | — | 0.25 | — | — | — |
| | Tetrazole compound (BHT—2NH$_3$) | — | — | 0.5 | — | — | — | — | — | — | 0.5 | — | — | — | — |
| MB | MB1 | — | — | — | — | — | — | 5 | — | — | — | — | — | — | — |
| | MB2 | — | — | — | — | — | — | — | — | — | — | — | — | — | 5 |
| Foam nucleating agent | Boron nitride | — | — | — | — | 0.5 | — | — | — | — | — | — | 0.5 | — | — |
| | Talc | — | — | — | — | — | 0.5 | — | — | — | — | — | — | 0.5 | — |
| Characteristics [ ] = Acceptability criteria | Outer diameter of insulation layer (φ mm) 2.65 ± 0.1 | 2.67 | 2.64 | 2.63 | 2.68 | 2.65 | 2.63 | 2.7 | 2.68 | 2.69 | 2.67 | 2.62 | 2.72 | 2.67 | 2.7 |
| | Degree of foaming of insulation layer (%) | 43.5 | 43.3 | 43.9 | 43.8 | 45.3 | 43.9 | 43.2 | 43.8 | 43.4 | 43.4 | 46.2 | 43 | 43.5 | 43.2 |
| | Average bubble size (equivalent circle diameter φ μm) | 120 | 190 | 170 | 130 | 85 | 87 | 120 | 140 | 197 | 175 | 140 | 100 | 100 | 130 |
| | Attenuation (2 GHz) (dB/100 m) [≤48.9] | 48.7 | 48.9 | 48.8 | 48.7 | 48.6 | 48.6 | 48.8 | 48.7 | 48.9 | 48.8 | 48.8 | 48.7 | 48.7 | 48.8 |
| | Voltage standing wave ratio (VSWR) [≤1.1] | 1.05 | 1.1 | 1.07 | 1.06 | 1.03 | 1.02 | 1.06 | 1.08 | 1.1 | 1.07 | 1.06 | 1.03 | 1.03 | 1.08 |
| | Characteristic impedance (Ω) [50 ± 1] | 49.9 | 49.4 | 49.3 | 50.2 | 49.9 | 49.3 | 50.5 | 50.2 | 50 | 49.4 | 49.5 | 50.9 | 49.9 | 50.5 |
| | Solder dip resistance (260° C. x 10 sec) [Shrinkage ≤ 5 mm] | 0.8 | 1.1 | 0.9 | 0.8 | 0.7 | 0.7 | 1 | 0.5 | 0.7 | 0.6 | 0.5 | 0.3 | 0.3 | 0.6 |
| | Deformation ratio (5N x 10 min) [≤20%] | 12 | 17 | 15 | 14 | 7 | 9 | 11 | 13 | 18 | 15 | 14 | 10 | 11 | 14 |
| | Pull-out force (25 mm) [≥10N] | 14 | 11 | 14 | 13 | 16 | 16 | 14 | 16 | 11 | 16 | 16 | 17 | 18 | 15 |

Ex.: Example

In Examples 15 to 21 shown in Table 2, FEP is used as a base resin.

In Examples 15, 0.5% of ADCA was added as a chemical blowing agent. Use of ADCA which generates a large amount of cracked gas and is effective as a foam nucleating agent provides small bubble size and small variation in outer diameter. As a result, the degree of foaming, the characteristic impedance, the attenuation and the VSWR were all within the standards and the results for the solder dip resistance, the deformation ratio and the pull-out force were all acceptable.

In Example 16, 0.5% of OBSH was added as a chemical blowing agent. Use of OBSH which generates a large amount of cracked gas but is less effective as a foam nucleating agent resulted in large bubbles and large variation in outer diameter. However, the degree of foaming and the characteristic impedance were within the standards, and as a result, the attenuation and the VSWR were also within the standards. In addition, there is no problem in the solder dip resistance. The deformation ratio and the pull-out force were both deteriorated due to the large bubble size but were still within the acceptable range.

In Example 17, bistetrazole diammonium was used as a chemical blowing agent. Although the amount of cracked gas was large, the bubble size was slightly large since the effect as a foam nucleating agent is less than ADCA. However, the variation in outer diameter was small, and therefore, the degree of foaming, the characteristic impedance, the attenuation and the VSWR were all within the standards and the results for the solder dip resistance, the deformation ratio and the pull-out force were all acceptable.

In Example 18, ADCA and OBSH were used as a chemical blowing agent at a mixing ratio of 1:1. Since ADCA is highly effective as a foam nucleating agent, the bubble size was small and the variation in outer diameter was also small. As a result, the degree of foaming, the characteristic impedance, the attenuation and the VSWR were all within the standards and the results for the solder dip resistance, the deformation ratio and the pull-out force were all acceptable.

In Example 19, 0.5% of BN as a nucleating agent was added as well as ADCA as a chemical blowing agent. The bubble size was very small due to the effect of BN as a foam nucleating agent and the variation in outer diameter was also small. As a result, the degree of foaming, the characteristic impedance, the attenuation and the VSWR were all within the standards and the results for the solder dip resistance, the deformation ratio and the pull-out force were all acceptable.

In Example 20, talc was used as a nucleating agent. Since talc is highly effective as a foam nucleating agent in the same manner as BN, the bubble size was small. Therefore, the variation in outer diameter was small and the degree of foaming, the characteristic impedance, the attenuation and the VSWR were all within the standards. In addition, the results for the solder dip resistance, the deformation ratio and the pull-out force were also acceptable.

In Example 21, a master batch having an ADCA concentration of 5% and FEP pellets were extruded together. Similarly to the result of the case where the pellets were extrusion-molded by the full-compound method, the bubble size was small and the variation in outer diameter was also small. Therefore, the degree of foaming, the characteristic impedance, the attenuation and the VSWR were all within the standards and the results for the solder dip resistance, the deformation ratio and the pull-out force were all acceptable.

In Examples 22 to 28 shown in Table 2, PFA is used as a base resin. Since PFA has a high melting point of 310° C., the results for the solder dip resistance at 270° C. which is lower than the melting point were acceptable in all of Examples 22 to 28.

In Examples 22, ADCA was used as a chemical blowing agent. Since ADCA which generates large amount of cracked gas and is also highly effective as a foam nucleating agent was used, the bubble size was small. Therefore, the variation in outer diameter was small and the degree of foaming, the characteristic impedance and the VSWR were all within the standards. In addition, the results for the deformation ratio and the pull-out force were both acceptable.

In Example 23, OBSH was used as a chemical blowing agent. Use of OBSH which generates a large amount of cracked gas but is less effective as a foam nucleating agent resulted in large bubble size and large variation in outer diameter, however, the degree of foaming, the characteristic impedance and the VSWR were all within the standards. The deformation ratio and the pull-out force were both deteriorated due to the large bubble size but were still within the defined range and were acceptable.

In Example 24, bistetrazole diammonium was used as a chemical blowing agent. Although the amount of cracked gas was large, the bubble size was relatively large since the effect as a foam nucleating agent is less than ADCA. This causes relatively large variation in outer diameter, however, the degree of foaming, the characteristic impedance, the attenuation and the VSWR were within the standards and the results for the deformation ratio and the pull-out force were also acceptable.

In Example 25, ADCA and OBSH were used at a mixing ratio of 1:1. Since ADCA is highly effective as a foam nucleating agent, the bubble size was small. Therefore, the variation in outer diameter was small and the degree of foaming, the characteristic impedance, the attenuation and the VSWR were all within the standards.

In Example 26, 0.5% of BN as a nucleating agent was added in addition to ADCA as a chemical blowing agent. The bubble size was further reduced since BN is highly effective as a foam nucleating agent. Therefore, the variation in outer diameter was small, the degree of foaming, the characteristic impedance, the attenuation and the VSWR were all within the standards and the results for the deformation ratio and the pull-out force were both acceptable.

In Example 27, talc was used as a nucleating agent. Since talc is highly effective as a foam nucleating agent in the same manner as BN, the bubble size was small. Therefore, the variation in outer diameter was small the degree of foaming, the characteristic impedance, the attenuation and the VSWR were all within the standards. In addition, the results for the deformation ratio and the pull-out force were both acceptable.

In Example 28, a master batch formed of ADCA and PFA pellets were extruded together. Similarly to the result of the case where the pellets were extrusion-molded by the full-compound method, the bubble size was small. Therefore, the variation in outer diameter was small, the degree of foaming, the characteristic impedance, the attenuation and the VSWR were all within the standards and the results for the deformation ratio and the pull-out force were both acceptable.

Comparative Example of Thick Foam Insulated Wire/Cable

In Comparative Example 7, pellets formed as Comparative Example using HDPE (99 mass %) and ADCA (1 mass %) were kneaded, foamed and extruded as an foamed insulation layer to cover the inner conductor, and thick foam insulated wire and cable as Comparative Example were made in the same manner as Examples. Since HDPE has a low melting point of 135° C., the result for the solder dip resistance was not acceptable.

Comparative Example 8 is an example of the physical foaming method in which boron nitride (0.5 mass %) as a foam nucleating agent is mixed to FEP (99.5 mass %) and nitrogen gas is used as a foaming agent at an injection pressure of 38 MPa. The full-compound method was used. It was not possible to control the bubble size, resulting in a large bubble size of 250 μm. As a result, the results for the deformation ratio and the pull-out force were not acceptable.

Comparative Examples 9 to 11 are an example of the physical foaming method in which boron nitride (0.5 mass %) as a foam nucleating agent is mixed to an engineering plastic (99.5 mass %) as a base resin and nitrogen gas is used as a foaming agent at an injection pressure of 34 to 36 MPa (Comparative Example 9: 34 MPa, Comparative Example 10: 35 MPa, Comparative Example 11: 36 MPa). The full-compound method was used. Each dielectric constant is high such as 3.3 to 3.6. Therefore, the result for the VSWR, the attenuation and the characteristic impedance as electrical characteristics were not acceptable. The engineering plastics used are as follows.

Comparative Example 9: Polyamide Nylon 66 (Trade name: Maranyl A125J, manufactured by Unitika Ltd.)

Comparative Example 10: Polyether ether ketone (Trade name: 381G, manufactured by Vitrex)

Comparative Example 11: Polybutylene terephthalate (Trade name: TORAYCON 1401-X06, manufactured by Toray Industries, Inc.)

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A foamed resin molded article that is obtained by kneading and foaming a pellet comprising one or more fluorine resins and a chemical blowing agent in an extrusion molding process, wherein the pellet is formed by mixing, without heat fusion, powder of the one or more fluorine resins and powder of the chemical blowing agent, and then hardening and molding.

2. The foamed resin molded article according to claim 1, wherein the pellet is prepared as a master batch and is kneaded with a base resin containing one or more fluorine resins in an extrusion molding process.

3. The foamed resin molded article according to claim 1, wherein the fluorine resin comprises tetrafluoroethylene perfluoroalkyl vinyl ether copolymer (PFA) or tetrafluoroethylene-hexafluoropropylene copolymer (FEP).

4. The foamed resin molded article according to claim 2, wherein the fluorine resin contained in the pellet and/or the fluorine resin contained in the base resin comprises tetrafluoroethylene perfluoroalkyl vinyl ether copolymer (PFA) or tetrafluoroethylene-hexafluoropropylene copolymer (FEP).

5. The foamed resin molded article according to claim 1, wherein the pellet comprises not less than 0.1 mass % and not more than 3 mass % of the chemical blowing agent with respect to the total mass of the foamed resin molded article.

6. The foamed resin molded article according to claim 2, wherein the master batch comprises not less than 1 mass % and not more than 30 mass % of the chemical blowing agent with respect to the total mass of the master batch.

7. The foamed resin molded article according to claim 1, wherein the chemical blowing agent comprises an organic-based chemical blowing agent, and wherein the organic-based chemical blowing agent comprises one or more selected from azo compounds, hydrazide compounds, nitroso compounds, semicarbazide compounds, hydrazo compounds, tetrazole compounds, triazine compounds, ester compounds, hydrazone compounds and diazinon compounds.

8. The foamed resin molded article according to claim 1, wherein the pellet further comprises a foam nucleating agent.

9. The foamed resin molded article according to claim 1, wherein a degree of foaming is not less than 30%.

10. The foamed resin molded article according to claim 1, wherein an average bubble size (equivalent circle diameter) is not more than 200 μm.

11. A foam insulated wire, comprising: an insulation layer comprising the foamed resin molded article according to claim 1.

12. A cable, comprising: the foam insulated wire according to claim 11.

13. A method of manufacturing a foamed resin molded article, comprising: making pellets comprising one or more fluorine resins and a chemical blowing agent; and kneading and foaming the pellets in an extrusion molding process.

* * * * *